United States Patent
Yamamoto et al.

(10) Patent No.: US 9,505,056 B2
(45) Date of Patent: Nov. 29, 2016

(54) SLIDE VALVE APPARATUS FOR AUTOMATIC APPLICATION OF SURFACE PRESSURE

(71) Applicant: SHINAGAWA REFRACTORIES CO., LTD.

(72) Inventors: Kenji Yamamoto, Tokyo (JP); Yoshifumi Shigeta, Tokyo (JP); Mototsugu Osada, Tokyo (JP); Atsushi Takata, Tokyo (JP)

(73) Assignee: SHINAGAWA REFRACTORIES CO. LTD., Tokyo (JP)

( * ) Notice: Subject to any disclaimer, the term of this patent is extended or adjusted under 35 U.S.C. 154(b) by 0 days.

(21) Appl. No.: 14/391,099

(22) PCT Filed: Mar. 4, 2013

(86) PCT No.: PCT/JP2013/055817
§ 371 (c)(1),
(2) Date: Oct. 7, 2014

(87) PCT Pub. No.: WO2014/002530
PCT Pub. Date: Jan. 3, 2014

(65) Prior Publication Data
US 2015/0076385 A1    Mar. 19, 2015

(30) Foreign Application Priority Data
Jun. 28, 2012 (JP) .................. 2012-145174

(51) Int. Cl.
*F16K 3/16* (2006.01)
*B22D 41/38* (2006.01)
*B22D 41/40* (2006.01)

(52) U.S. Cl.
CPC ............... *B22D 41/38* (2013.01); *B22D 41/40* (2013.01); *F16K 3/16* (2013.01)

(58) Field of Classification Search
CPC ......... B22D 41/38; B22D 41/40; F16K 3/16; Y10T 137/5196; Y10T 137/5109; Y10T 137/5283
USPC .................. 251/326–329, 285; 137/269–271
See application file for complete search history.

(56) References Cited

U.S. PATENT DOCUMENTS 2,681,663 A * 6/1954 Ernau ........................ F01N 1/18
                                                         251/327
3,511,261 A * 5/1970 Bick ....................... B22D 41/24
                                                         251/326

(Continued)

FOREIGN PATENT DOCUMENTS

JP    2011-131253    7/2011
JP    4757714        8/2011

OTHER PUBLICATIONS

International Search Report issued Apr. 16, 2013 in International Application No. PCT/JP2013/055817.

*Primary Examiner* — John Bastianelli
(74) *Attorney, Agent, or Firm* — Wenderoth, Lind & Ponack, L.L.P.

(57) ABSTRACT

A slide valve apparatus for automatic application of surface pressure is configured to include a connection switching device (20) for switching a connection position of a drive device (7) and a slide case (4) between a first connection position (discharge position) during molten metal discharge and a second connection position (surface pressure operation position) during surface pressure application/release. As a result, the drive stroke of the drive device can be greatly reduced and the already installed drive device can be used as is when a SV apparatus is upgraded.

16 Claims, 20 Drawing Sheets

(FULLY OPEN POSITION)

(56) References Cited

U.S. PATENT DOCUMENTS

| | | | | |
|---|---|---|---|---|
| 4,042,207 A * | 8/1977 | Nehrlich | B22D 41/38 | 222/504 |
| 4,489,756 A * | 12/1984 | Balz | F16K 3/0263 | 251/328 |
| 4,573,616 A * | 3/1986 | Shapland | B22D 41/24 | 222/591 |
| 4,840,296 A * | 6/1989 | Otsuka | B22D 41/34 | 222/591 |
| 2005/0035325 A1 * | 2/2005 | Balasubramanian | F16K 7/126 | 251/331 |
| 2007/0080312 A1 * | 4/2007 | Mitsui | B22D 41/40 | 251/203 |
| 2007/0267591 A1 * | 11/2007 | Mitsui | B22D 41/24 | 251/302 |
| 2009/0184139 A1 * | 7/2009 | Mitsui | B22D 41/40 | 222/601 |
| 2012/0175542 A1 * | 7/2012 | Yamamoto | B22D 41/34 | 251/318 |

* cited by examiner (FULLY OPEN POSITION)

(FIRST EMBODIMENT)

(FIRST EMBODIMENT)

(FIRST EMBODIMENT)

(FIRST EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(THIRD EMBODIMENT)

FIG. 18 (THIRD EMBODIMENT)

(THIRD EMBODIMENT)

(FOURTH EMBODIMENT)

FIG. 21 (FOURTH EMBODIMENT)

SLIDE VALVE APPARATUS FOR AUTOMATIC APPLICATION OF SURFACE PRESSURE

TECHNICAL FIELD

The present invention relates to a slide valve apparatus for automatic application of surface pressure, and more particularly to a novel improvement for shortening the stroke of a drive device and reducing the size of the entire apparatus by switching the connection position of the drive device and a slide case with connection switching means.

BACKGROUND ART

A slide valve apparatus that is used for flow rate control when molten metal is discharged is typically provided with refractories such as a plurality of plates or a nozzle having a molten metal flow-through hole, and the cross-sectional area of the flow-through hole is changed to adjust the flow rate and close the flow-through hole by reciprocatingly moving a plate refractory, which is called a slide plate, among those refractories. In order to prevent the molten metal from leaking, a strong surface pressure is applied to the slide plate such that the slide plate is brought into intimate contact with a fixed plate which is fixed to a base frame. When the refractories attached to the apparatus, such as the plates, are inspected and replaced, this surface pressure is released and the slide valve apparatus is then opened. Where the inspection and replacement are completed, the slide valve apparatus is closed and the surface pressure is applied again for implementing the next operation. A large number of manual or automatic methods have been heretofore invented for applying/releasing the surface pressure in the above-described process.

The applicant has earlier suggested the configuration described in Patent Literature 1 as a slide valve apparatus for automatic application of surface pressure (referred to hereinbelow as SV apparatus) suitable for applying/releasing the surface pressure by moving a slide case accommodating the slide plate.

The SV apparatus described in Patent Literature 1 is provided with a surface pressure release position on the outer side of a discharge stroke, which is the movement range of the slide case during the discharge (between the fully closed position and fully open position of the flow-through hole), and the surface pressure can be automatically applied/released by reciprocatingly moving the slide case between the surface pressure release position and within the discharge stroke.

The operation of the SV apparatus described in Patent Literature 1 is described below in a simple manner.

Thus, as shown in FIGS. 22 to 26, during the usual operation, rollers $13_1$, $13_2$ of a slide case 4 are placed on the upper surfaces of lower sides 10b, 10b of surface pressure load members 10, 10 as shown in FIGS. 22 and 24, the slide case 4 receives an upward pushing force through the surface pressure application members 10, 10 due to the elastic force of compression springs 12, 12 and a slide plate 5 is thus pressed against a fixed plate 3 by a predetermined surface pressure.

Further, a stopper 17 is advanced and inserted between the base frame 2 and a rod connection portion 4a of the slide case 4, thereby preventing the slide case 4 from unintentionally moving to a "replacement position C".

FIG. 24 shows a state during molten metal outflow realized when the flow-through holes 3a, 5a of the fixed plate 3 and the slide plate 5 are aligned. In order to stop the outflow of the molten metal from this state, a drive device 7 is actuated to extend a rod 7a and move the slide case 4 to a "fully closed position B", thereby ensuring the misalignment of the flow-through holes 3a, 5a and stopping the outflow of the molten metal.

The state in which the slide plate 5 is constantly pressed by the surface pressure application members 10 against the fixed plate 3 under the predetermined surface pressure is maintained even when the slide plate 5 moves from a "fully open position A" to a "fully closed position B", thereby preventing the leak of steel and introduction of air.

Further, where a chute nozzle 6 or the slide plate 5 is damaged by melting, it is replaced, and in such a case, the stopper 17 is initially moved back and pulled out from between the base frame 2 and the rod connection portion 4a of the slide case 4, and then the rod 7a of the drive device 7 is shortened and the slide case 4 is moved to the "replacement position C".

Where the replacement position C is reached, the rollers $13_1$, $13_2$ of the slide case 4 escape to the outside from an end 10c and a notch 14 of the lower sides 10b, 10b of the surface pressure application members 10, 10 respectively. As a result, the slide case 4 can be turned outwardly about a shaft 15, as shown in FIG. 26, and after the slide case 4 has been turned to the outside, the slide plate 5 and the chute nozzle 6 are pulled out, new chute nozzle and slide plate are set, and the slide case 4 can be returned to the operation state by pushing the rollers $13_1$, $13_2$ in to the level of the upper surface of the lower side 10b of the surface pressure application member 10 and then extending the rod 7a of the drive device 7.

The stopper 17 is then moved forward and introduced between the base frame 2 and the slide case 4 side, and subsequent operations are started.

Patent Literature 1: Japanese Patent No. 4,216,422

DISCLOSURE OF THE INVENTION

Since the conventional slide valve apparatus has the above-described configuration, the following problems are associated therewith.

(1) An extra stroke (surface pressure operation stroke) for surface pressure application/release is necessary, as shown in FIG. 23, separately from the discharge stroke and in addition to the discharge stroke.

(2) Therefore, the drive device is accordingly increased in length, and the SV apparatus is also enlarged in the stroke direction.

(3) Further, where the user upgrades a device of another system to the SV apparatus described in Patent Literature 1, the stroke is insufficient with the already installed drive device, this drive device should be replaced with a larger one, and the cost is accordingly increased.

(4) In particular, where the drive device and slide case are joined through a crank or the like, rather than disposed on a straight line, the mounting position or size of the crank or the like should be also changed to adapt for the stroke extension when upgrading to the SV apparatus.

In accordance with the present invention, the extra surface pressure operation stroke for surface pressure application release, which is necessary in addition to the discharge stroke, is absorbed inside the slide valve apparatus by using connection switching means, the enlargement of the drive stroke range of the drive device is inhibited, and the already installed drive device can be used when the slide valve apparatus is upgraded.

The slide valve apparatus for automatic application of surface pressure in accordance with the present invention includes a fixed plate incorporated in a base frame fixedly attached to a lower surface of a bottom portion of a molten metal vessel; a slide case that is movably provided below the fixed plate, incorporates a slide plate inside thereof, and supports a chute nozzle; and a drive device that moves the slide case, flow rate control and surface pressure application/release during molten metal discharge being performed by moving the slide case with the drive device, the slide valve apparatus for automatic application of surface pressure further including connection switching means for switching a connection position of the drive device and the slide case between a first connection position (discharge position) during molten metal discharge and a second connection position (surface pressure operation position) during surface pressure application/release, the second connection position being different from the first connection position.

The apparatus may be configured such that the drive device and the slide case are connected by a guide piece, and the connection switching means is provided at the guide piece.

The apparatus may be configured such that the drive device and the slide case are disposed on a straight line.

The apparatus may be configured such that the drive device and the slide case are not disposed on a straight line, and the drive device is connected to the slide case or the guide piece by a direction converting mechanism for converting a drive direction of the drive device into a movement direction of the slide case.

The apparatus may be configured such that switching of the connection position is performed by actuating the drive device according to an operation of the connection switching means.

The apparatus may be configured such that the connection switching means is constituted by a member that is provided inside an opening formed in the guide piece and has a recess.

The apparatus may be configured such that the connection switching means is configured by a removable/insertable connection pin for connecting the drive device to the slide case or a guide piece, and a connection site constituted by first and second connection orifices for removably/insertably mounting the connection pin at the discharge position and surface pressure operation position, and the connection position of the drive device is switched by removing/inserting the connection pin, selecting the connection site corresponding to the discharge position or the surface pressure operation position, and performing connecting.

The apparatus may be configured such that a connection member constituted by a projecting portion formed at a distal end of a rod of the drive device abuts against first and second alignment surfaces provided inside an opening formed in the guide piece, thereby aligning the connection member with the discharge position or surface pressure operation position for connecting the drive device to the slide case or the guide piece.

The apparatus may be configured such that the alignment surfaces are of a flat, curved, or polygon shape.

In the apparatus, the guide piece may be configured to move linearly along a guide rail provided at the base frame and an extension guide installed such as to slide along and extend the guide rail.

Because of the above-described configurations, the slide valve apparatus for automatic application of surface pressure can demonstrate the following effects.

Thus, in the slide valve apparatus for automatic application of surface pressure, which includes: a fixed plate incorporated in a base frame fixedly attached to the lower surface of the bottom portion of a molten metal vessel; a slide case that is movably provided below the fixed plate, incorporates a slide plate inside thereof, and supports a chute nozzle; and a drive device that moves the slide case, and in which flow rate control and surface pressure application/release during molten metal discharge are performed by moving the slide case with the drive device, connection switching means is provided for switching the connection position of the drive device and the slide case between a first connection position (discharge position) during molten metal discharge and a second connection position (surface pressure operation position) during surface pressure application/release, the second connection position being different from the first connection position. As a result, the extra stroke for surface pressure application/release is absorbed inside the SV apparatus and the drive stroke of the drive device can be greatly suppressed by comparison with the conventional configurations. Further, the already installed drive device can be used as is when the SV apparatus is upgraded.

Further, with the configuration in which the drive device and the slide case are connected by a guide piece, and the connection switching means is provided at the guide piece, switching of the position with the position switching means can be performed smoothly and rapidly.

Further, with the configuration in which the drive device and the slide case are not disposed on a straight line, and the drive device is connected to the slide case or the guide piece by a direction converting mechanism for converting the drive direction of the drive device into a movement direction of the slide case, the stroke direction of the SV apparatus can be further shortened.

Further, with the configuration in which switching of the connection position is performed by actuating the drive device according to the operation of the connection switching means, the connection switching operation is very easy to perform.

Further, with the configuration in which the connection switching means is constituted by a member that is provided inside an opening formed in the guide piece and has a recess, the rod can be held in the recess and the alignment of the connection switching means is very easy to perform.

The configuration can be also used in which the connection switching means is configured by a removable/insertable connection pin for connecting the drive device to the slide case or the guide piece, and a connection site constituted by first and second connection orifices for removably/insertably mounting the connection pin at the discharge position and surface pressure operation position, and the connection position of the drive device is switched by removing/inserting the connection pin, selecting the connection site corresponding to the discharge position or the surface pressure operation position, and performing connecting. In this case, the operation of changing the connection position also can be performed very easily.

Further, with the configuration in which a connection member constituted by a projecting portion formed at a distal end of a rod of the drive device abuts against first and second alignment surfaces provided inside an opening formed in the guide piece, thereby aligning the connection member with the discharge position or surface pressure operation position for connecting the drive device to the slide case or the guide piece, the replacement and alignment of the connection switching means are very easy to perform.

Further, where the guide piece is configured to move linearly along a guide rail provided at the base frame and an extension guide installed such as to slide along and extend the guide rail, the length of the guide rail can be shortened by the extension amount of the extension guide, and the total length of the SV apparatus can be accordingly reduced.

BEST MODE FOR CARRYING OUT THE INVENTION

Figure 1:
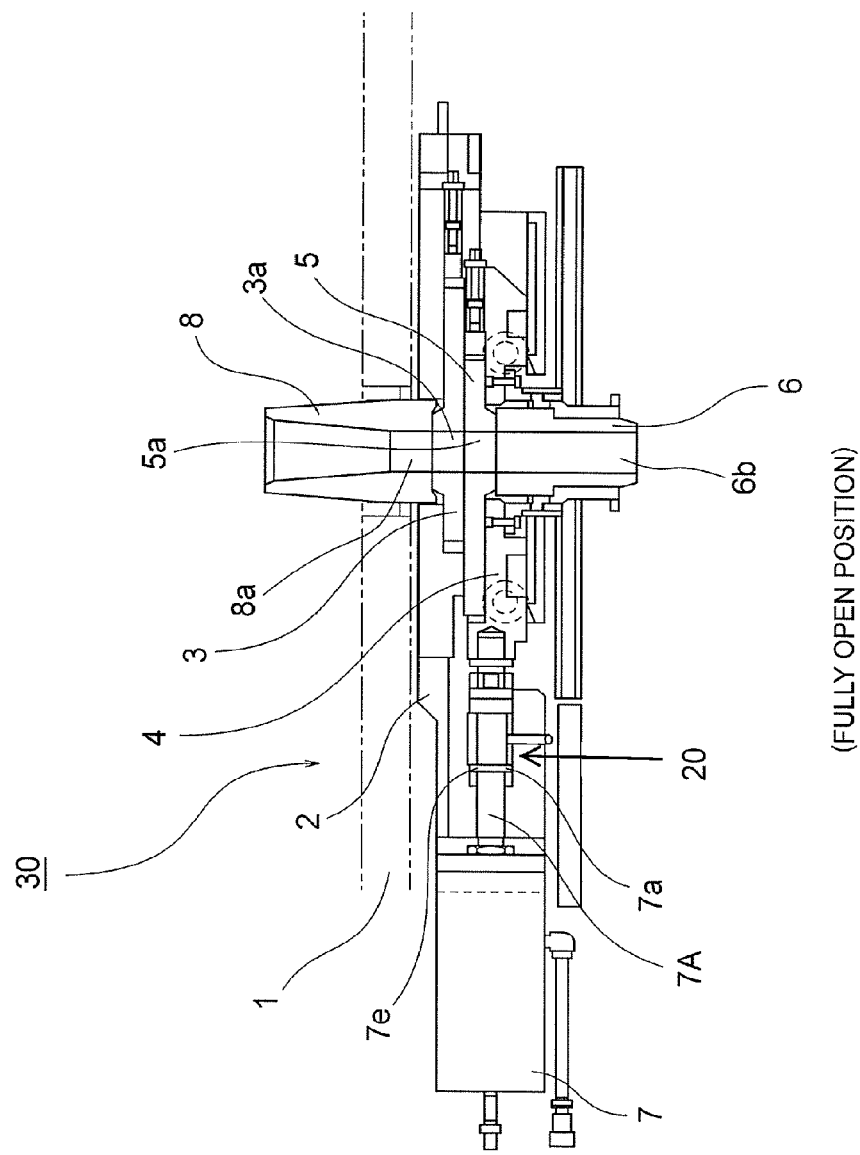
FIG. 1 is a cross-sectional view showing a fully open position of the slide valve apparatus for automatic application of surface pressure in accordance with the present invention.

It is an object of the present invention to provide a slide valve apparatus for automatic application of surface pressure such that the stroke of the drive device can be shortened by comparison with that in the conventional configuration and the size of the entire apparatus can be reduced by switching the connection position of the drive device and the slide case with the connection position switching means.

Examples

The preferred embodiments of the slide valve apparatus for automatic application in accordance with the present invention will be explained below with reference to the appended drawings.

Components the same as or similar to those of the conventional example are explained using the same reference numerals.

As mentioned hereinabove, in the slide valve apparatus for automatic application of surface pressure in accordance with the present invention, the connection position of the slide case 4 and the drive device 7 can be switched at the time of molten metal discharge (discharge position) and at the time of refractory inspection and replacement (surface pressure operation position), the movement amount corresponding to the surface pressure operation stroke is absorbed inside the slide valve apparatus by a spacing between the first connection position (discharge position) during molten metal discharge and a second connection position (surface pressure operation position) during refractory inspection and replacement, the second connection position being different from the first connection position. As a result, the drive device is prevented from increasing in size due to the enlargement of the stroke thereof, and the expansion of the drive range of the drive device and the increase of the slide valve apparatus in size can be inhibited.

FIG. 1 is a cross-sectional view showing a fully open position of the slide valve apparatus for automatic application of surface pressure in accordance with the present invention.

In the two-layer configuration shown in FIG. 1, a fixed plate 3 is incorporated in a base frame 2 fixed to the bottom portion of a molten metal vessel 1. A slide plate 5 and a chute nozzle 6 are supported inside a slide case 4 positioned below the fixed plate 3. A rod-shaped rod 7A of a drive device 7 and a connection member 7a constituted by a projecting portion 7e formed at the distal end of the rod are connected to the slide case 4 through connection switching means 20 constituted by connection switching means.

Where the slide case 4 is pushed/pulled by the drive device 7 through the connection member 7a and the connection switching means 20, a flow-through hole 3a and a flow-through hole 5a of the fixed plate 3 and the slide plate 5 are aligned or misaligned, thereby controlling the outflow of molten metal flowing down from the molten metal vessel 1 through an insert nozzle 8.

Figure 2:
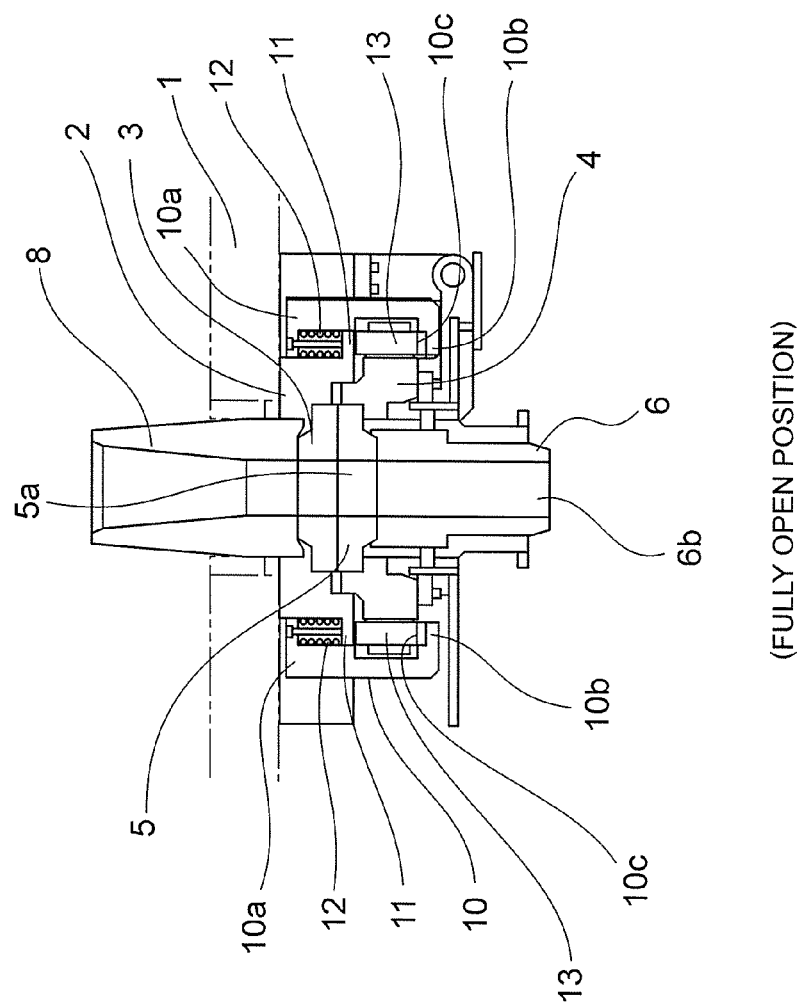
FIG. 2 is a transverse sectional view of the apparatus shown in FIG. 1.

FIG. 2 is a transverse sectional view of the principal portion of the configuration shown in FIG. 1. A protruding edge 11 overhanging in the horizontal direction is formed at the lower position on the side surface at each end of the base frame 2, a compression spring 12, as an example of an elastic body, is inserted in a compressed state between the upper surface of the protruding edge 11 and the lower surface of an upper side 10a of a surface pressure application member 10, and the surface pressure application member 10 is biased upward at all times.

The lower side 10b of the surface pressure application member 10 is formed in a state of entering the lower surface of the side portion of the slide case 4, and both side portions of the slide case 4 are supported by the lower sides 10b.

Rollers 13 are provided, as support members, by two at each side on both sides of the slide case 4, and each roller 13 is placed to rotate along an upper surface 10c of the lower side 10b as a rail. Since the upper surface 10c serves as a cam surface, when the slide case 4 is caused to slide along the longitudinal direction by the actuation of the drive device 7, the slide case 4 is biased upward, in a well-known manner through the roller 13 and the upper surface 10c and through the surface pressure application member 10. As a result, the slide plate 5 assumes a surface pressure application state in which the slide plate is pressed against the fixed plate 3 by a predetermined surface pressure.

Contrary to what is stated above, where the slide case 4 is moved by the drive device 7 to the surface pressure release position, the rollers 13 escape from the surface pressure application member 10, and the upward biasing of the slide case 4 is released, the slide plate 5 assumes a state in which it is not pressed against the fixed plate 3, and a surface pressure release state is assumed.

Figure 3:
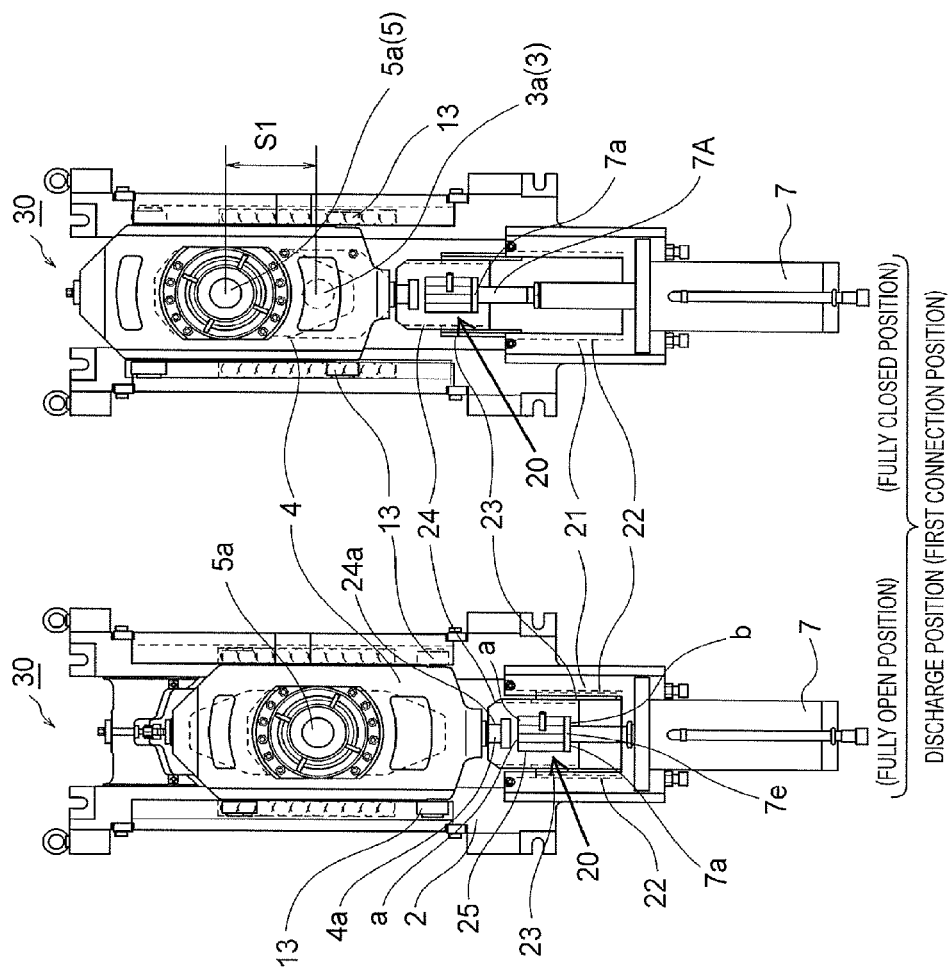
FIG. 3 is a plan view showing the discharge stroke in a fully open position and fully closed position in the apparatus shown in FIG. 1.

FIG. 3 shows a plan-view configuration of the slide valve apparatus 30 shown in FIGS. 1 and 2 described hereinabove. Shown in the figure are a fully open position and a fully closed position in the first connection position (discharge position) during molten metal discharge, in which the slide case 4 is moved only through a discharge stroke S1 by using the connection switching means 20 which is particularly disclosed in the present invention.

Figure 7:
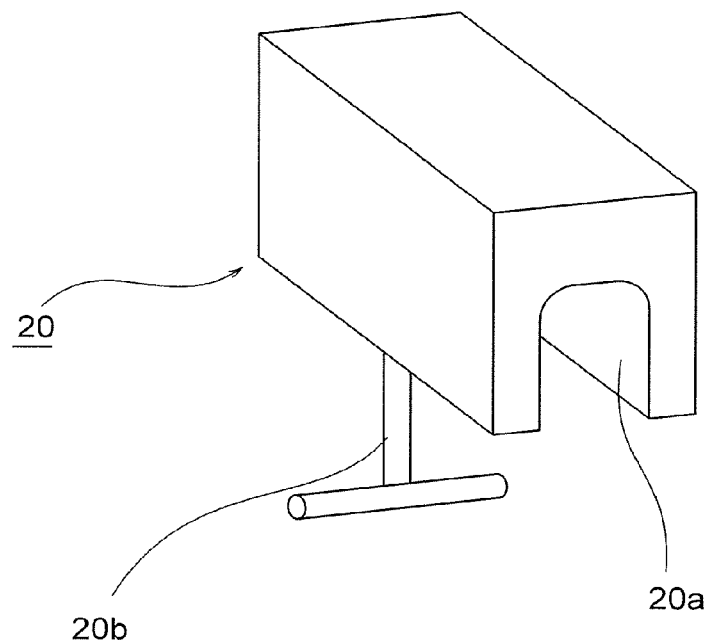
FIG. 7 is an enlarged perspective view showing the first embodiment of the connection switching means shown in FIG. 5.
Figure 8:
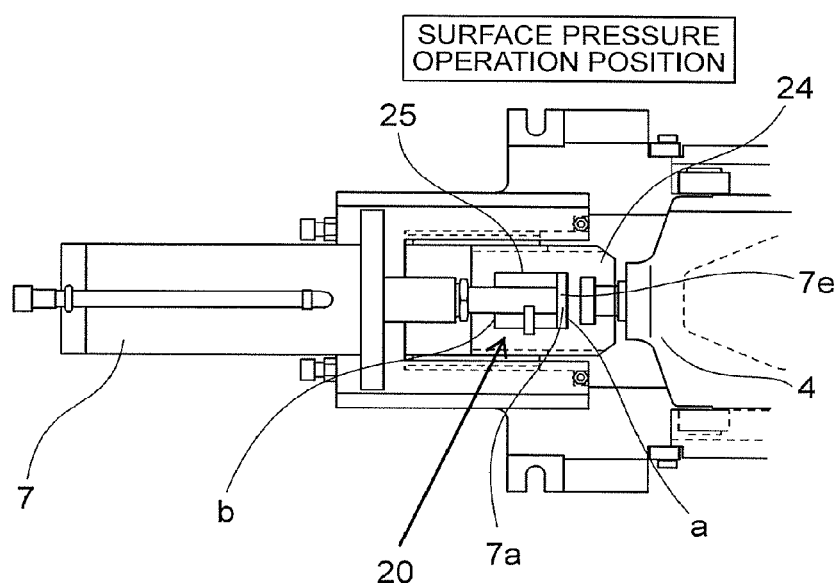
FIG. 8 is a plan view showing the state in which the connection position is at the surface pressure operation position in the apparatus shown in FIG. 5.
Figure 9:
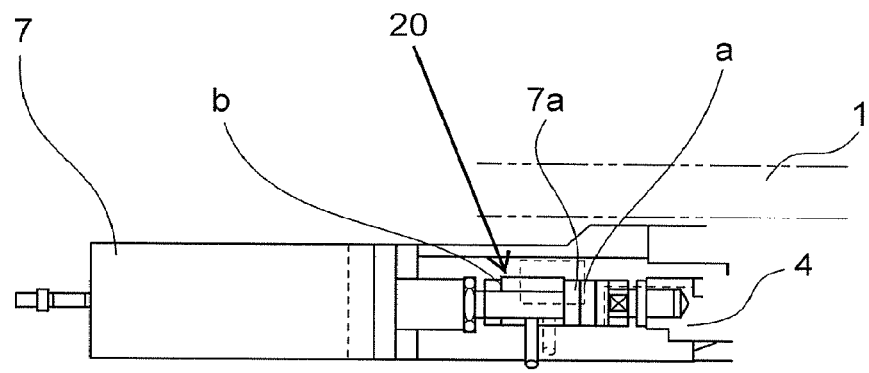
FIG. 9 is an explanatory drawing illustrating the operation of connection position switching during surface pressure application, this drawing being a cross-sectional view of the configuration shown in FIG. 8.
Figure 10:
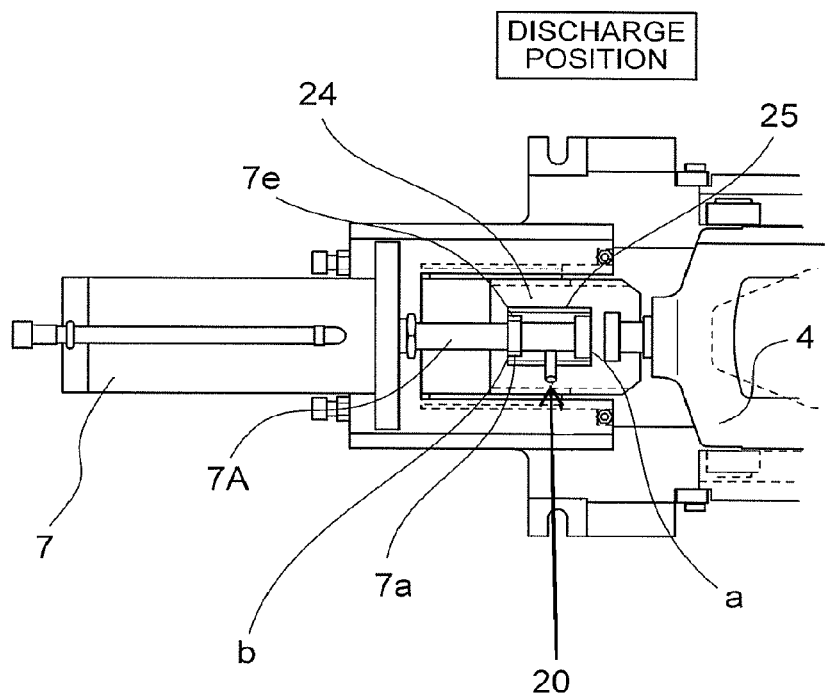
FIG. 10 is a plan view showing the state in which the connection position is at the discharge position in the second embodiment of the present invention.
Figure 11:
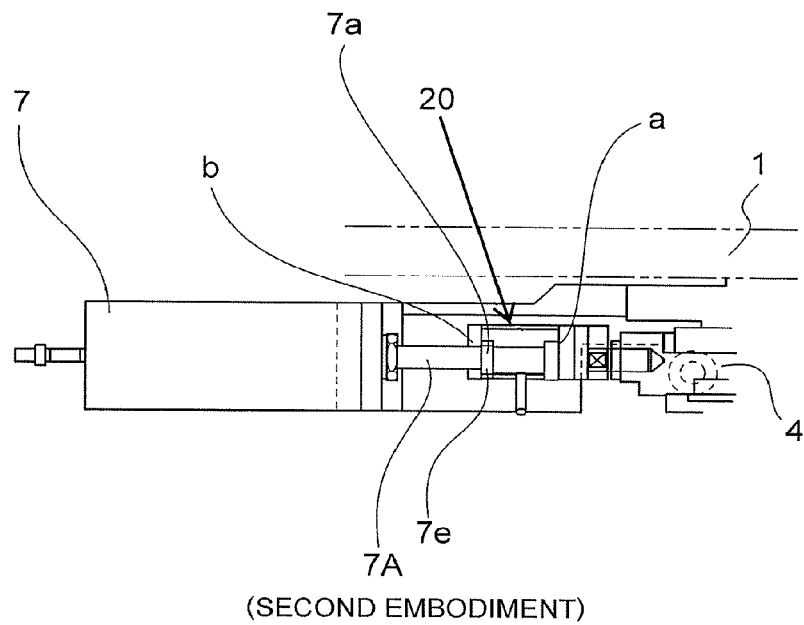
FIG. 11 is an explanatory drawing illustrating the operation of connection position switching during surface pressure release, this drawing being a cross-sectional view of the configuration shown in FIG. 10.

As shown in FIG. 7, the connection switching means 20 is constituted as a whole by a tetragonal angular body, in a plan view thereof, a recess 20a of a semicircular columnar shape is provided at one surface side thereof, and a handle 20b is provided at the other surface. A guide rail body 21 is provided at the base frame 2 on the drive device 7 side, and the drive device 7 is connected to one end of the guide rail body 21.

A pair of guide rails 22 of a zigzag or concave cross-sectional shape is formed on the inner side of the guide rail body 21, a pair of elongated extension guides 23 is provided on the inner side of the guide rails 22 so as to slide and move linearly therealong, and the guide rail 22 can be extended by the extension guide 23.

A guide piece 24 having a predetermined length and a plate shape in a plan view thereof is provided on the inner side of each extension guide 23 so as to be capable of moving linearly along the longitudinal direction thereof.

The guide rail 22 is provided at the drive device 7 side or at the base frame 2 and configured such that the guide piece 24 can move linearly along the extension guide 23 that is provided to slide along and extend the guide rail 22.

An opening 25 is formed in the guide piece 24, the connection switching means 20 is provided inside the opening 25, the projecting portion 7e of the connection member 7a of the drive device 7 abuts against one surface of the connection switching means 20 on the drive device 7 side, and a connection protrusion 4a of the slide case 4 is connected to a connection portion 24a of the guide piece 24 on the flow-through hole 5a side.

The distance between the connection member 7a and the slide case 4 at the fully open position shown in FIG. 3 is the longest through the connection switching means 20. Where the drive device 7 is actuated in this state and the connection member 7a is advanced through the discharge stroke S1 to the upper position shown in the figure, the guide piece 24 separates from the guide rail 22 through the extension guide 23 and moves to the fully closed position shown in FIG. 3, the flow-through holes 8a, 3a are closed, and the discharge of the molten metal is stopped.

Figure 4:
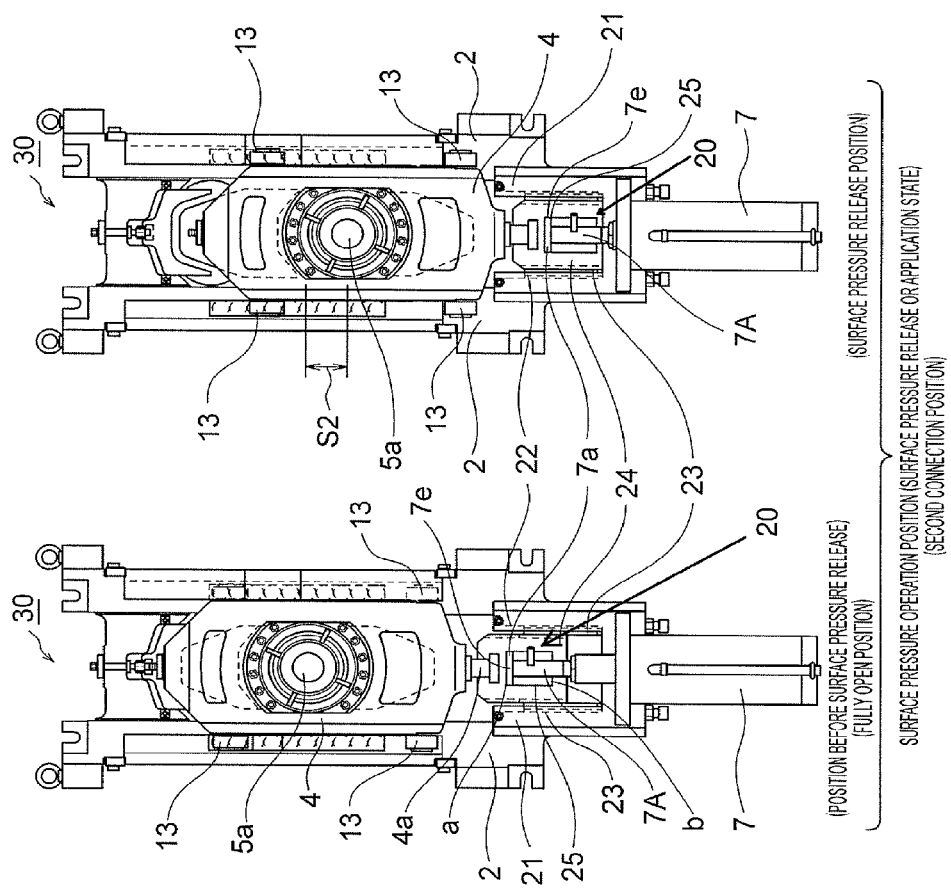
FIG. 4 is a plan view showing the surface pressure operation stroke at a position before the surface pressure release (fully open position) and the surface pressure release position in the apparatus shown in FIG. 1.
Figure 5:
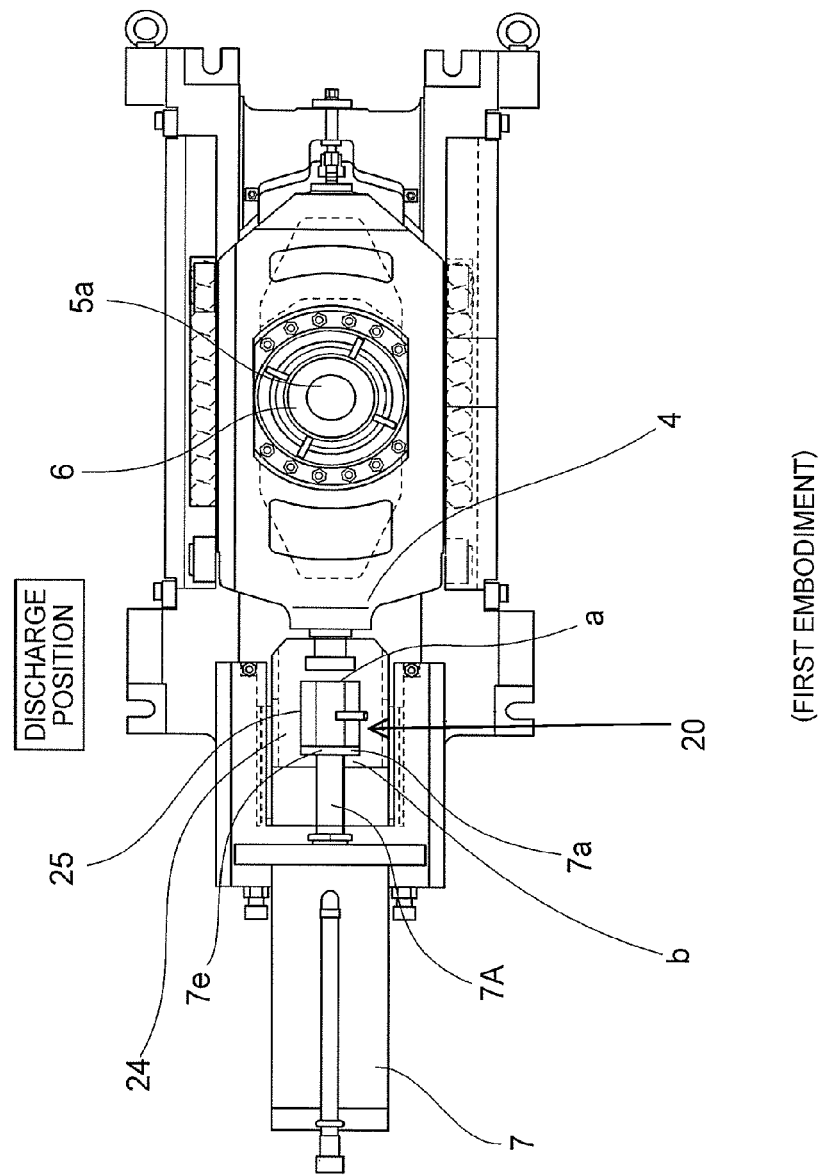
FIG. 5 is a plan view showing the state in which the connection position is at the discharge position in the first embodiment of the present invention.
Figure 6:
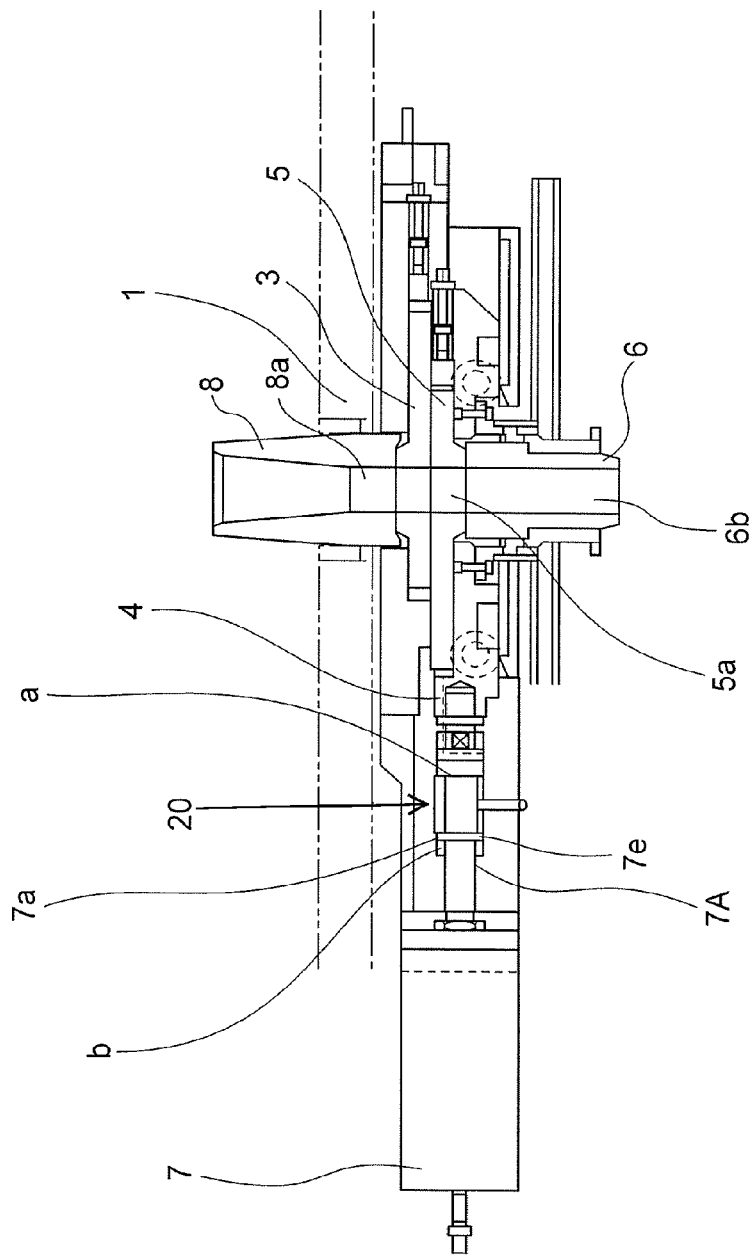
FIG. 6 is an explanatory drawing illustrating the operation of connection position switching during surface pressure release, this drawing being a cross-sectional view of the configuration shown in FIG. 5.

The connection switching means 20 is configured such that the connection switching means can be caused to slide inside the guide piece 24, without being taken out of the slide valve apparatus 30, from the discharge position shown in FIG. 3 to the surface pressure operation position shown in FIG. 4, that is, to the second connection position of the connection switching means 20.

As mentioned hereinabove, in the configuration shown in FIG. 3, the connection switching means 20 is provided between the connection member 7a of the drive device 7 and a flat first alignment surface (a) of the opening 25 positioned on the connection protrusion 4a side, but in the aforementioned second connection position, as shown in FIG. 4, the connection switching means 20 is positioned on the outer circumference of the rod 7A and provided between the projecting portion 7e of the connection member 7a and a flat second alignment surface (b) of the opening 25 which is positioned on the drive device 7 side and faces the first alignment surface (a).

The aforementioned connection switching means 20 can be moved manually from the position shown in FIG. 3 to the position shown in FIG. 4, or in the opposite direction, and the connection member 7a can be moved by slightly shifting the connection switching means 20 inside the opening 25 of the guide piece 24. This operation is necessarily a manual operation and can be also performed with a manipulator (not shown in the figure). Further, the alignment surfaces (a) and (b) can be of a curved or polygonal shape, rather than flat.

The connection positions of the connection switching means 20 can be switched while the slide case 4 is stopped.

The guide piece 24 is a member that connects the drive device 7 and the slide case 4 and also causes the slide case 4 to move smoothly by moving along the guide rail 22 serving to cause the drive force of the drive device 7, which is located in a main body of the SV apparatus 30, to act accurately in the movement direction of the slide case 4. Slide valve apparatuses also provided with a similar member have been disclosed prior to the date of filing of the present application, for example, in aforementioned Patent Literature 1, and are well known. In the present invention, the below-described effect is obtained by using a combination of the extension guide 23 and the guide piece 24 having the connection switching means 20.

As described hereinabove, in the present invention, when the molten metal is discharged, the rod 7A of the drive device 7 is connected to the discharge position (shown in FIG. 3) of the guide piece 24 on the drive device 7 side. When the refractories are inspected and replaced, the position of the connection switching means 20 is shifted, and the connection position of the rod 7A of the drive device 7 is switched to the surface pressure operation position (shown in FIG. 4) of the guide piece 24 on the slide case 4 side. In other words, the movement amount corresponding to the surface pressure operation stroke S2 shown in FIG. 4 is absorbed by the length of the connection switching means 20, thereby making it possible to suppress the expansion of the drive range of the drive device 7 and the enlargement of the SV apparatus 30.

When a molten metal is discharged, the extension guides 23 located at both sides of the guide piece 24 act to extend the guide rail 22 of the main body of the SV apparatus 30. Therefore, part of the movement amount corresponding to the discharge stroke S1 shown in FIG. 3 is absorbed by the extension amount created by the extension guide 23, and the length of the guide rail 22 of the main body of the SV apparatus 30 is further shortened, thereby making it possible to reduce further the total length of the SV apparatus 30. The extension guide 23 may be provided at either of the guide piece 24 and the guide rail 22.

A similar effect can be also obtained by attaching the connection switching means 20 to the slide case 4 or drive device 7 and directly connecting the slide case 4 and the drive device 7, without using the guide piece 24, as in the present embodiment.

A surface pressure release/application method for use in the slide valve apparatus for automatic application of surface pressure in accordance with the present invention is explained below on the basis of the configuration shown in FIGS. 5 to 9 of the first embodiment of the present invention.

The figures show a state in which the refractories located inside the SV apparatus are inspected/replaced in a state in which the SV apparatus is raised with the drive device 7 being on the lower side. In this case, the first and second connection positions of the connection switching means 20 in two locations are taken as a surface pressure operation position on the drive device 7 side and as a discharge position on the slide case 4 side, but the reverse configuration can be also used. Further, in the present embodiment, the surface pressure release position is on the fully open position side, but it may be also provided on the fully closed position side. In the opening 25 of the guide piece 24, the first alignment surface (a) and the second alignment surface (b), which are flat surfaces, are provided at the surface pressure operation position and discharge position, respectively, for aligning the connection member 7a at the distal end of the drive device 7.

In the first embodiment shown in FIGS. 5 to 9 hereinabove, the surface pressure release procedure is implemented in the sequence A to J described below.

A. The drive device 7 is operated, and the slide case 4 is moved to the fully open position. Then, the connection switching means 20 is pushed to the molten metal vessel 1 side (referred to hereinbelow as vessel 1 side). As a result, the connection of the drive device 7 and the guide piece 24 is released.

B. The drive device 7 is operated and the connection member 7a is moved till it abuts against the alignment surface (a).

C. The connection switching means 20 is moved to the alignment surface (b) side.

D. The connection switching means 20 is pulled back from the vessel 1 side. As a result, the drive device 7 and the guide piece 24 are connected at the surface pressure operation position.

E. The drive device 7 is operated, and the slide case 4 is moved to the surface pressure release position. As a result, the surface pressure is released.

The SV apparatus 30 is then opened, the refractories are inspected and replaced, the SV apparatus 30 is then closed, and switching of the surface pressure application and connection positions is thereafter performed by the following procedure.

F. The drive device 7 is operated and the slide case 4 is moved to the fully open position. As a result, the surface pressure is applied.

G. The connection switching means 20 is pushed to the vessel 1 side. As a result, the connection of the drive device 7 and the guide piece 24 is released.

H. The drive device 7 is operated and the connection member 7a is moved till it abuts against the alignment surface (b).

I. The connection switching means 20 is moved to the alignment surface (a) side.

J. The connection switching means 20 is pulled back from the vessel 1 side. As a result, the drive device 7 and the guide piece are connected at the discharge position.

Figure 12:
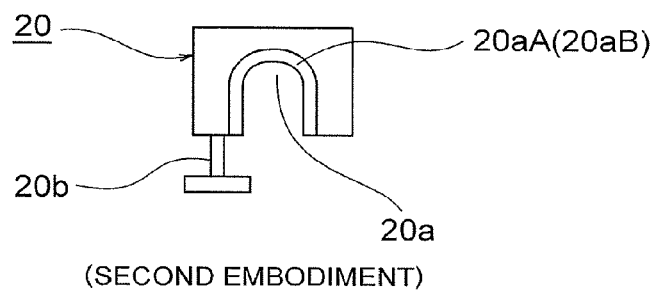
FIG. 12 is a front view showing the connection switching means in the configuration shown in FIG. 10.
Figure 13:
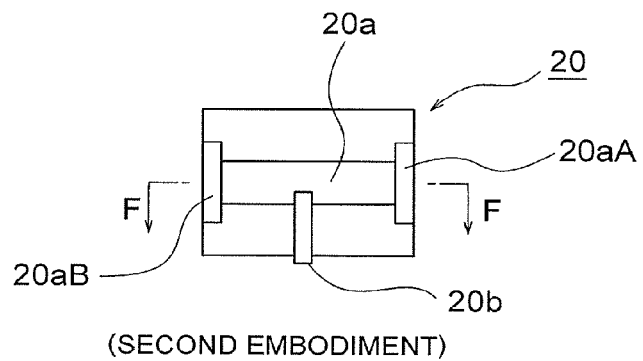
FIG. 13 is a plan view of the configuration shown in FIG. 12.
Figure 14:
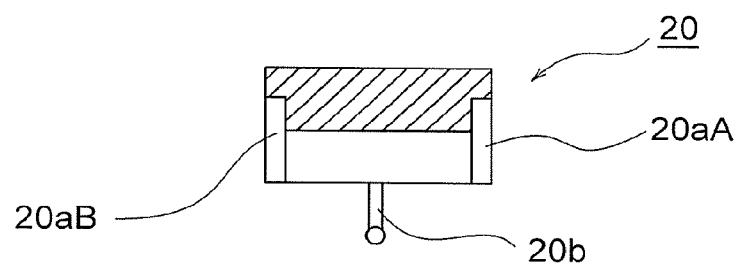
FIG. 14 is a cross-sectional view taken along the F-F line in FIG. 13.
Figure 15:
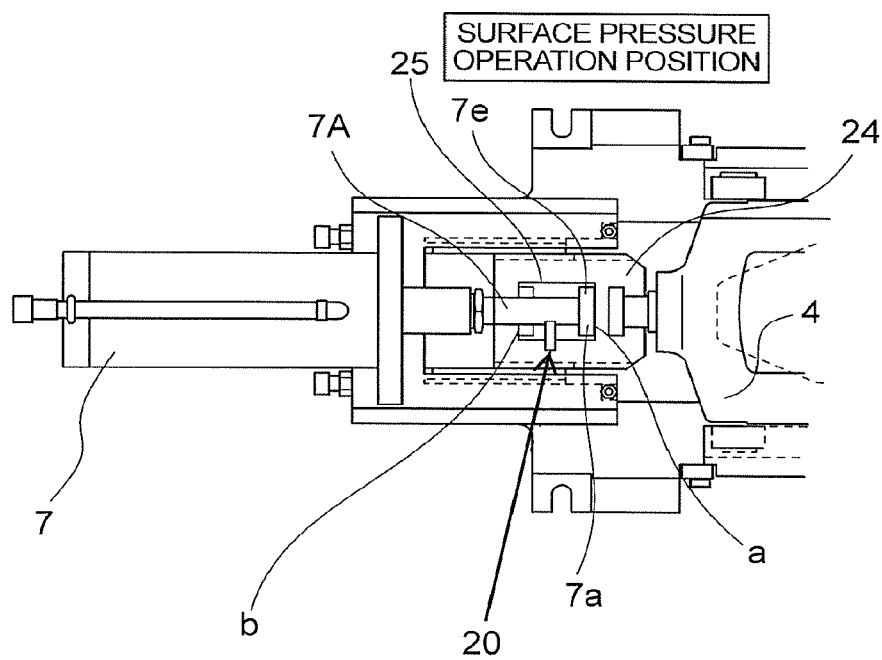
FIG. 15 is a plan view showing the state in which the connection position is at the surface pressure operation position in the second embodiment of the present invention.
Figure 16:
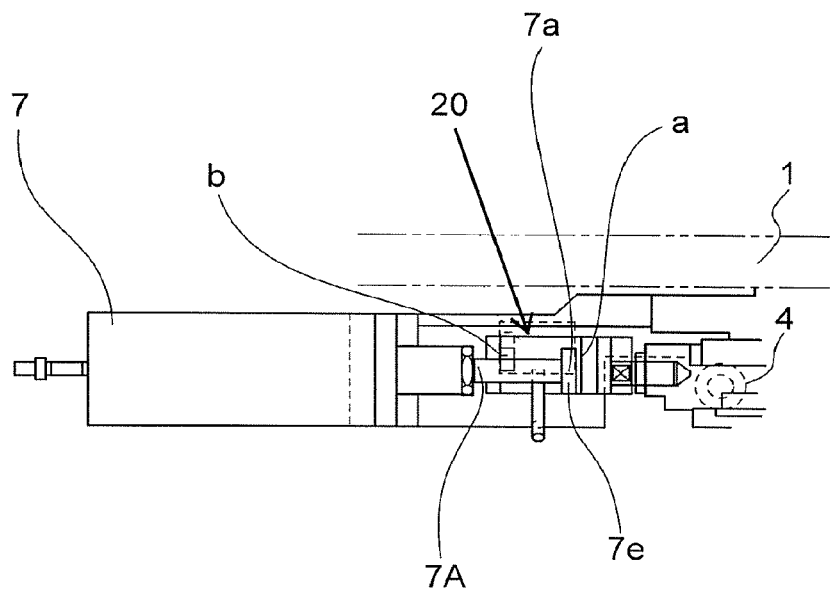
FIG. 16 is an explanatory drawing illustrating the operation of connection position switching during surface pressure release, this drawing being a cross-sectional view of the configuration shown in FIG. 15.

In the second embodiment of the present invention illustrated by FIGS. 10 to 16, the configuration is modified with the object of improving operability, this configuration being the same as that in the first embodiment 1, except for the shape of the connection switching means 20. More specifically, the shape of the connection switching means 20 is changed as shown in FIGS. 12 to 14 to enable the implementation of the above-described procedure of the first embodiment in which steps C and I are omitted. Portions of the procedure A to J of the first embodiment that are identical to those of the procedure of the second embodiment are explained using the same reference symbols. Therefore, the surface pressure release/application method in the second embodiment is implemented in the following manner.

A. The drive device 7 is operated, and the slide case 4 is moved to the fully open position. Then, the connection switching means 20 is pushed to the molten metal vessel 1 side. As a result, the connection of the drive device 7 and the guide piece 24 is released.

B. The drive device 7 is operated and the connection member 7a is moved till it abuts against the first alignment surface (a).

D. The connection switching means 20 is pulled back from the vessel 1 side. As a result, the drive device 7 and the guide piece 24 are connected at the surface pressure operation position.

E. The drive device 7 is operated, and the slide case 4 is moved to the surface pressure release position. As a result, the surface pressure is released.

The SV apparatus 30 is then opened, the refractories are inspected and replaced, the slide valve apparatus 30 is closed, and switching of the surface pressure application and connection positions is thereafter performed by the following procedure.

F. The drive device 7 is operated and the slide case 4 is moved to the fully open position. As a result, the surface pressure is applied.

G. The connection switching means 20 is pushed to the vessel 1 side. As a result, the connection of the drive device 7 and the guide piece 24 is released.

H. The drive device 7 is operated and the connection member 7a is moved till it abuts against the second alignment surface (b).

J. The connection switching means 20 is pulled back from the vessel 1 side. As a result, the drive device 7 and the guide piece 24 are connected at the discharge position.

As shown in FIGS. 12 to 14, the shape of the entire connection switching means 20 is similar to that shown in FIG. 7, but first and second counterbore portions 20aA, 20aB are formed at both sides of the recess 20a, which has a diameter suitable for receiving the rod 7A. Each counterbore portion is constituted by a counterbore which is larger in diameter than the recess 20a.

The counterbore portions 20aA, 20aB are configured such that the projecting portion 7e located at the distal end of the rod 7A can be fitted inside the counterbore portions.

Components the same as or similar to those of the above-described first embodiment are assigned with the same reference numerals and the explanation thereof is herein omitted.

Figure 17:
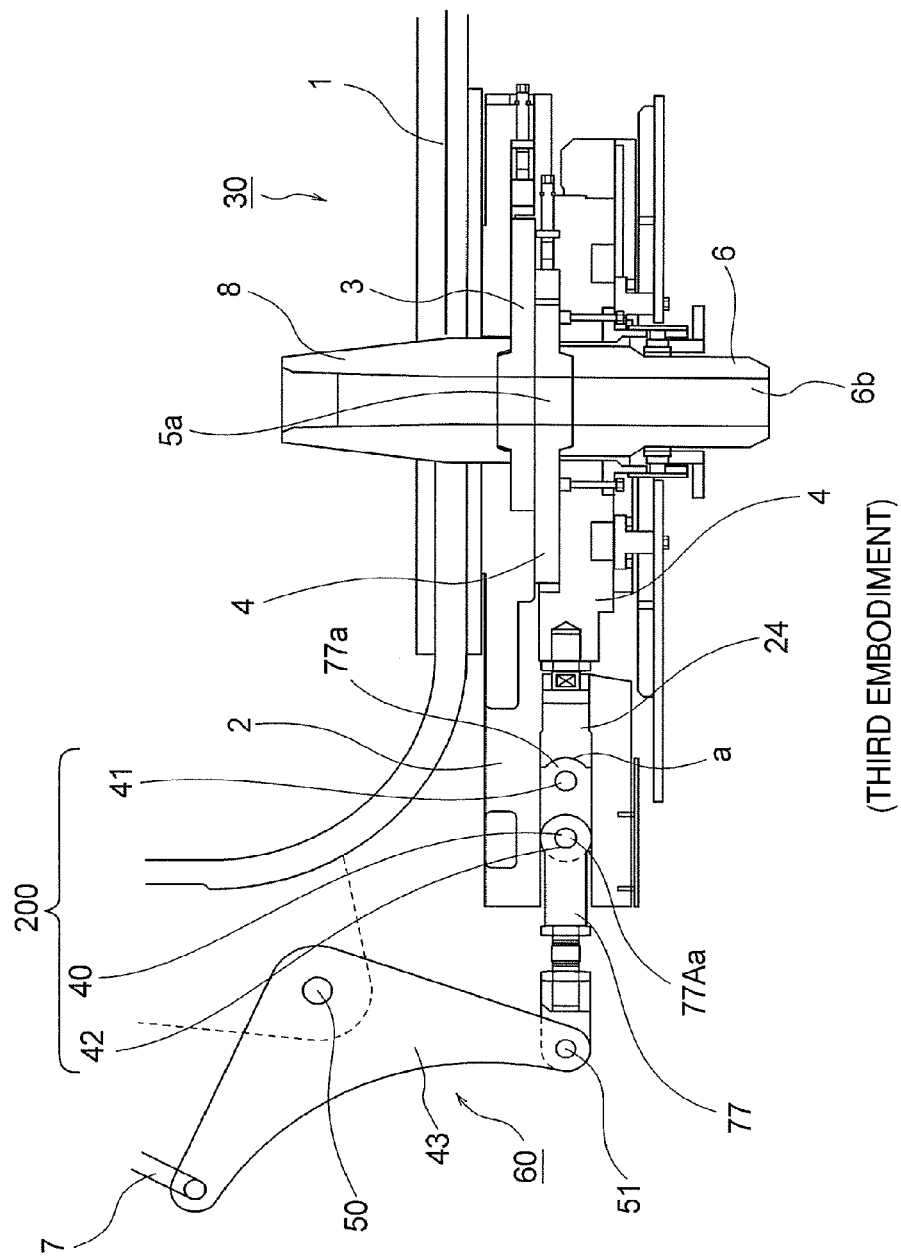
FIG. 17 is a cross-sectional view showing the state in which the connection position is at the discharge position in the third embodiment of the present invention.
Figure 18:
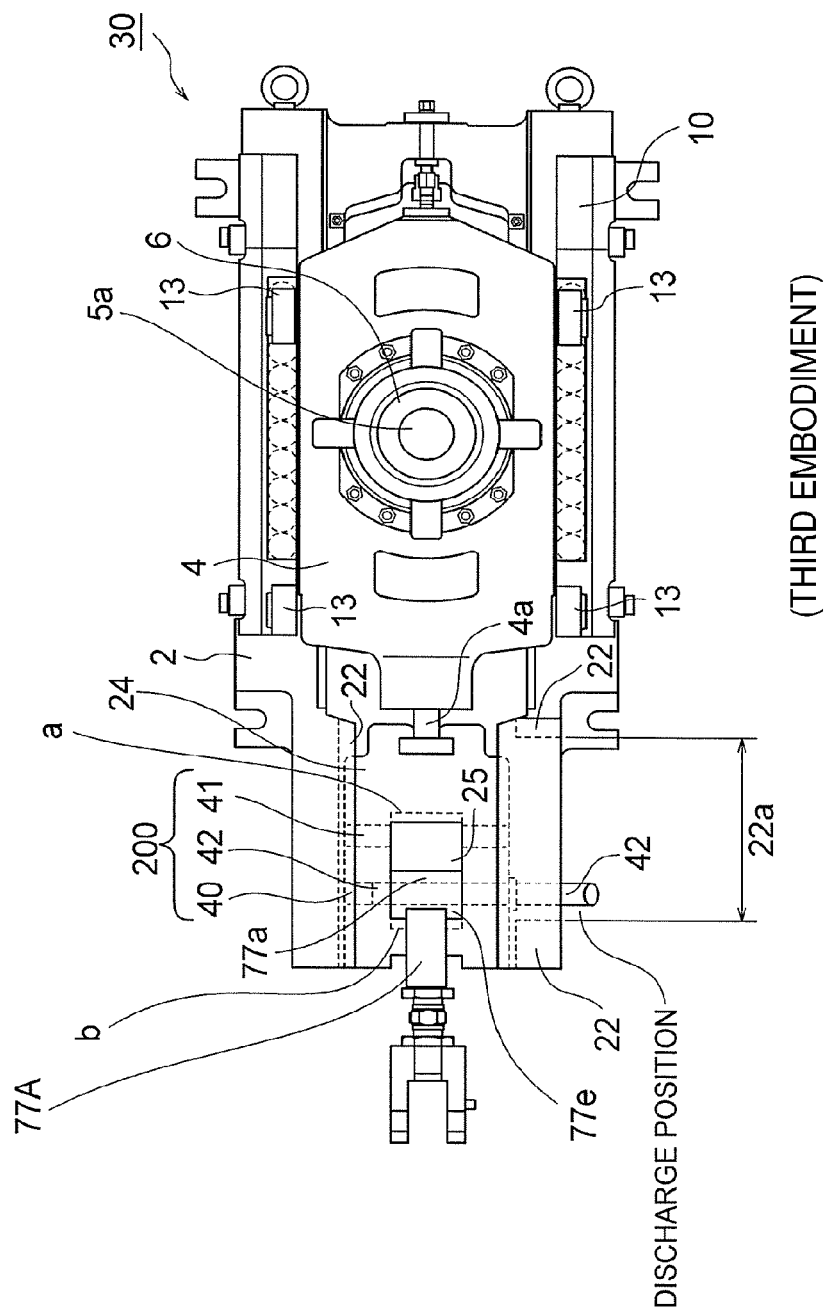
FIG. 18 is an explanatory drawing illustrating the operation of connection position switching during surface pressure release, this drawing being a plan view of the apparatus shown in FIG. 17.
Figure 19:
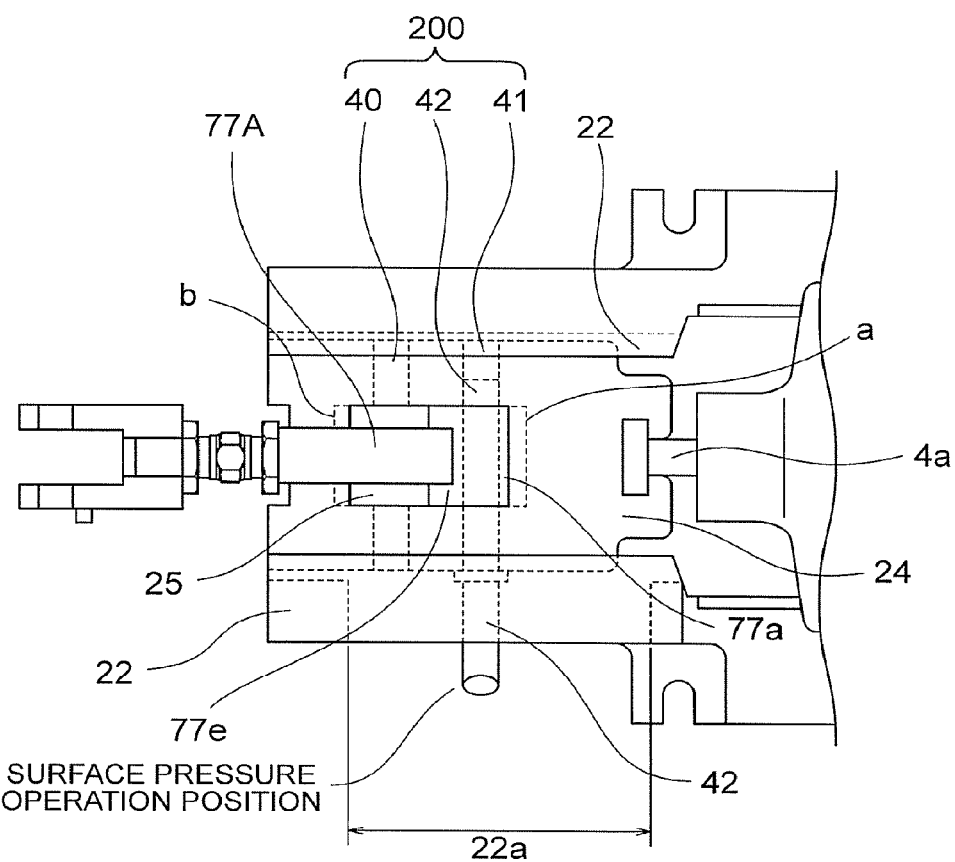
FIG. 19 is an explanatory drawing illustrating the operation of connection position switching during surface pressure application, this drawing being a plan view showing the state in which the connection position is at the surface pressure operation position in the apparatus shown in FIG. 17.
Figure 20:
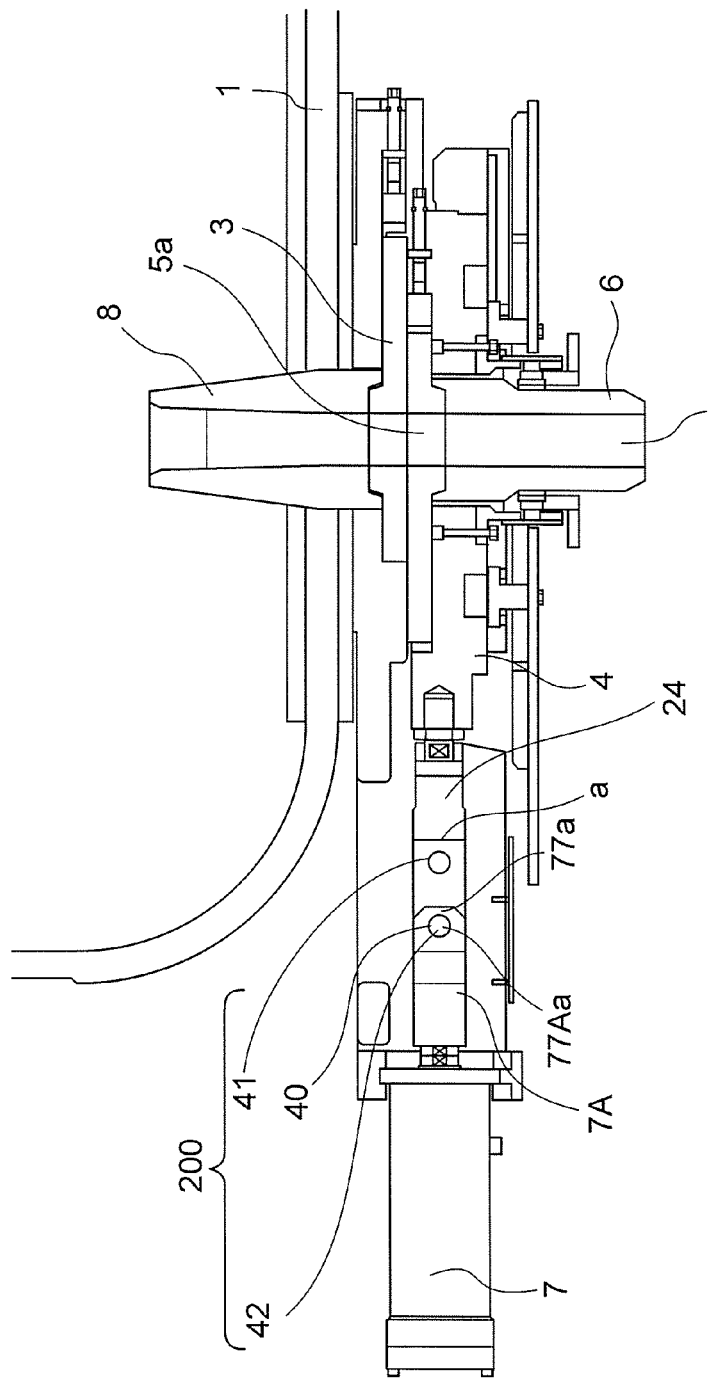
FIG. 20 is a cross-sectional view showing the state in which the connection position is at the discharge position in the fourth embodiment of the present invention.
Figure 21:
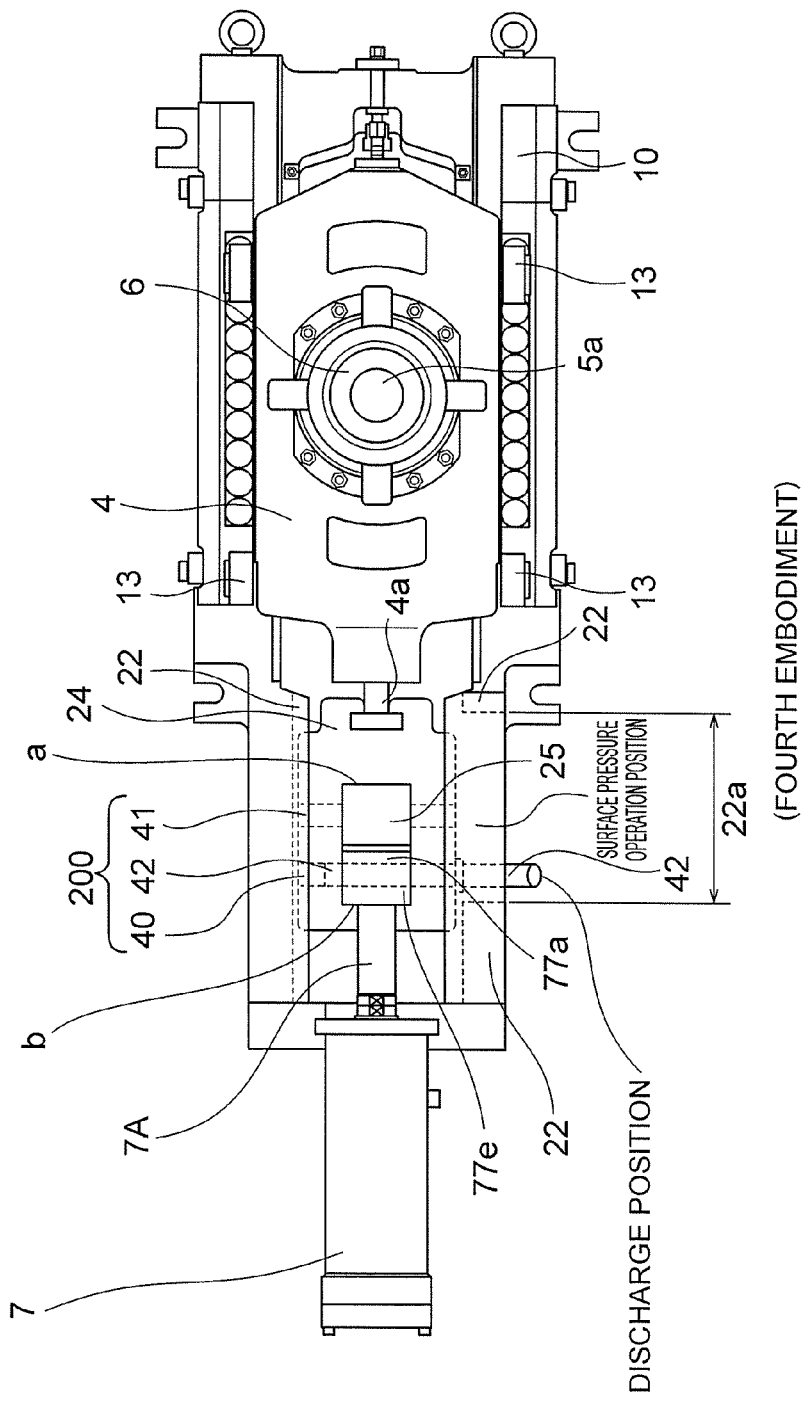
FIG. 21 is a plan view of the configuration shown in FIG. 20.
Figure 22:
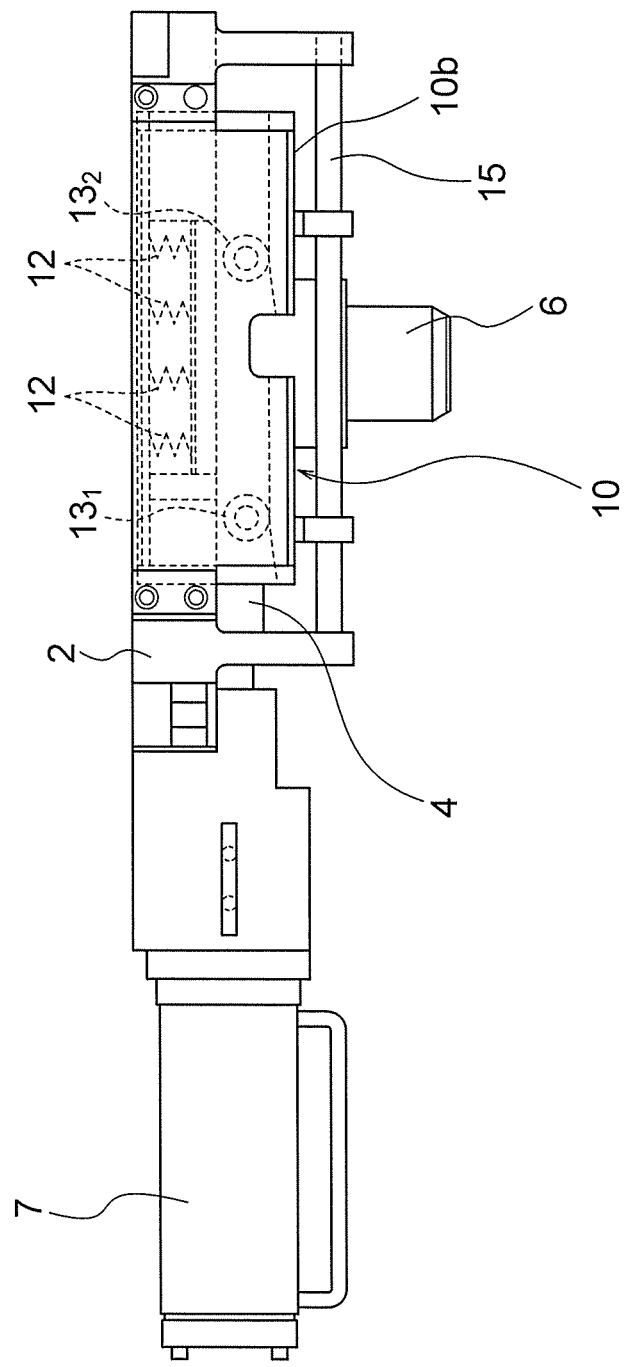
FIG. 22 is a side view showing the conventional slide valve apparatus.
Figure 23:
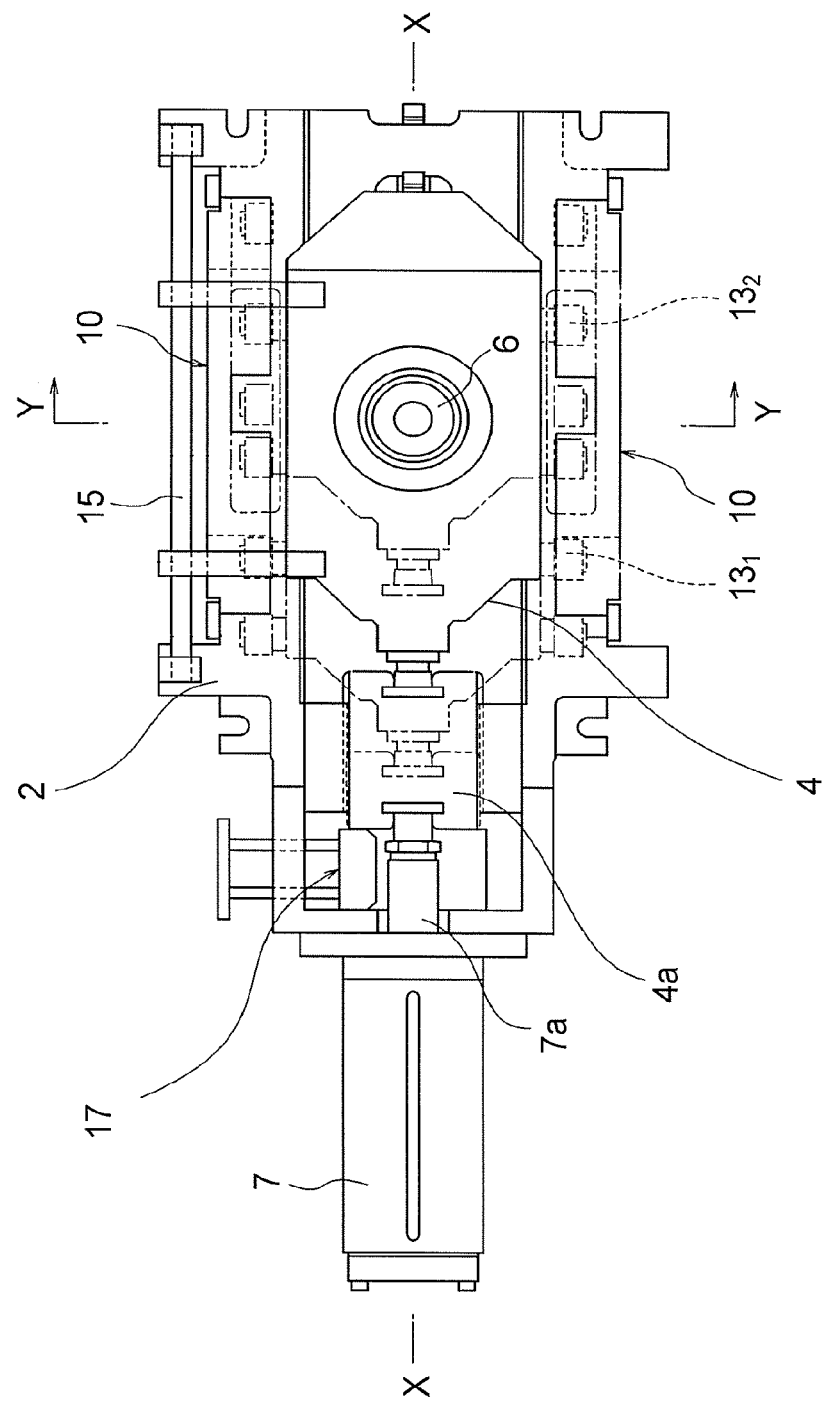
FIG. 23 is a lower surface view of the configuration shown in FIG. 22.
Figure 24:
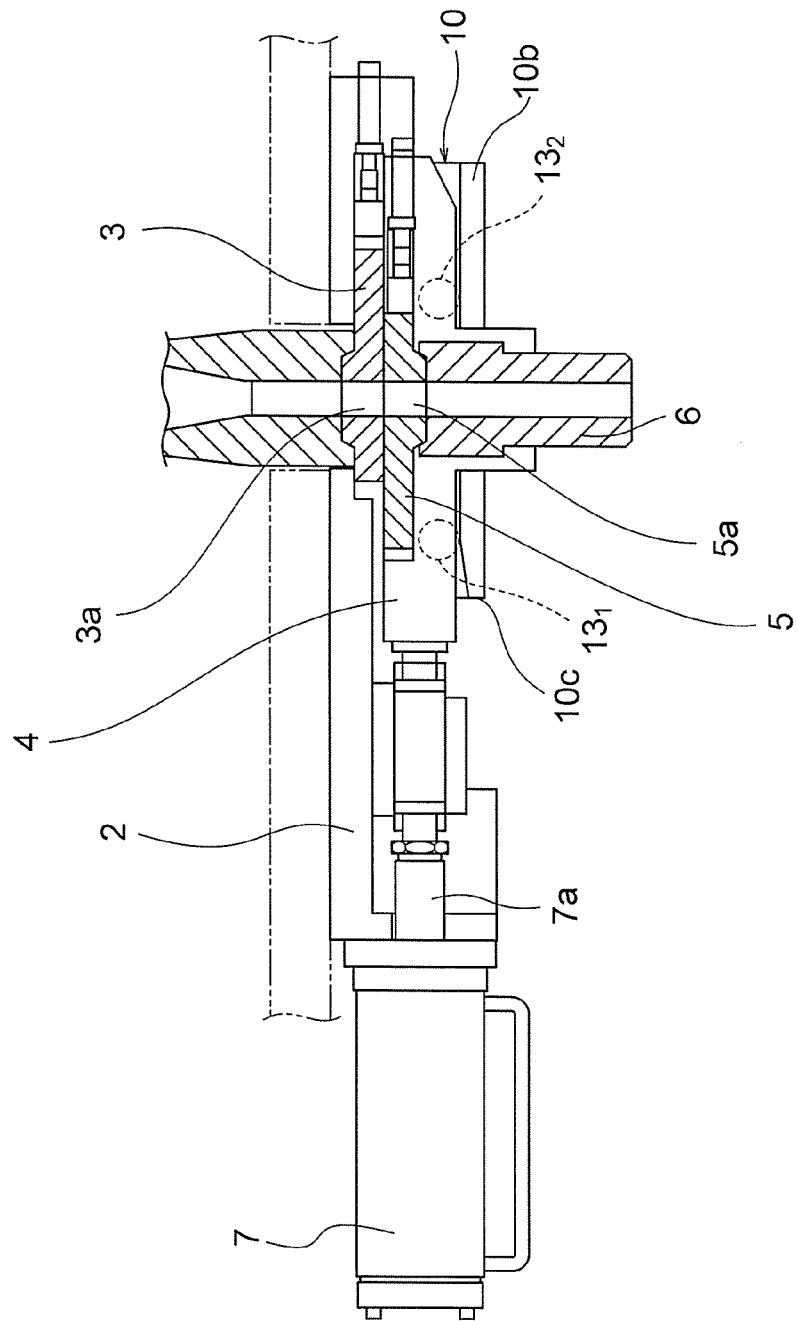
FIG. 24 is a cross-sectional view taken along the X-X line in FIG. 23.
Figure 25:
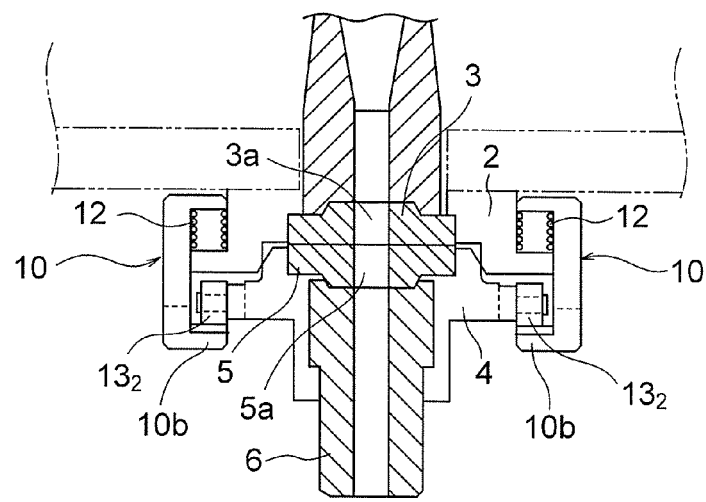
FIG. 25 is a cross-sectional view taken along the Y-Y line in FIG. 23.
Figure 26:
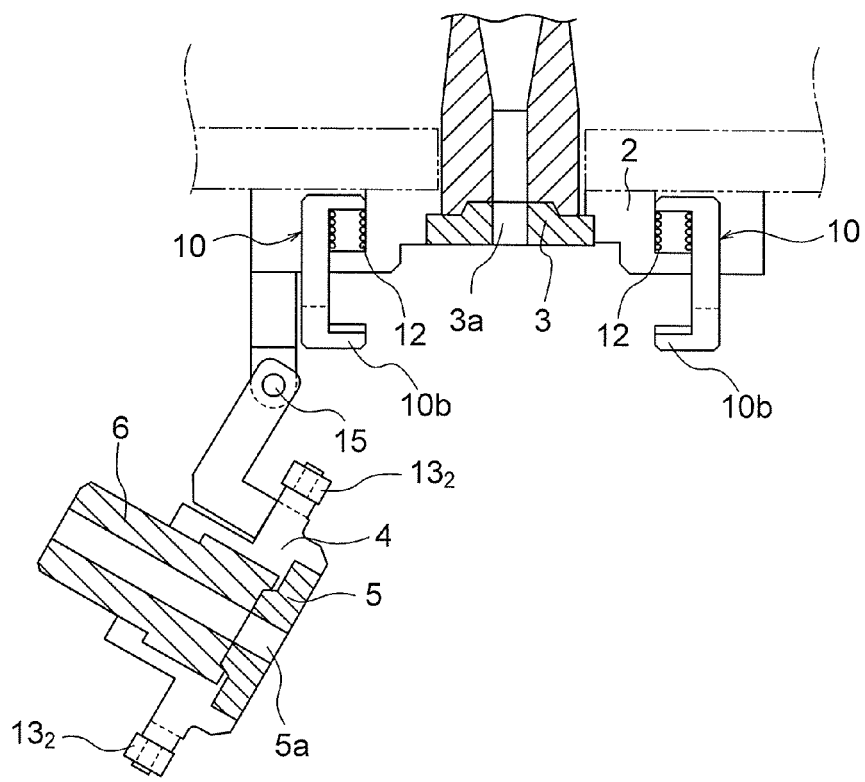
FIG. 26 is a cross-sectional view showing the state obtained by outward rotation of the slide case.

In the third embodiment of the present invention shown in FIGS. 17 to 19 and the fourth embodiment shown in FIGS. 20 and 21, two, first and second, connection orifices 40, 41 are provided in the guide piece 24, and the embodiments are configured such that the connection position during the discharge and surface pressure release/application can be switched by selecting either of the connection orifices 40, 41, inserting the connection pin 42 therein, and selectively connecting the guide piece 24 to a projecting portion 77e having a connection orifice 77Aa formed in the rod 7A which is the connection member. The connection orifices 40, 41 form connection sites. Further, a notch 22a is formed in the guide rail 22 on the side where the connection pin 42 is inserted. The bell crank 43 forms a direction converting mechanism 60 for converting the drive direction of the drive device 7 into the movement direction of the slide case 4.

In the configuration of the third embodiment shown in FIGS. 17 to 19, the drive device 7 constituted by an actuator or the like is connected through the bell crank 43 and bearings 50, 51 to the rod 77A, and the connection orifice 77Aa of the rod 77A can be connected to either of the connection orifices 40, 41. Further, in the third embodiment, connection switching means 200 is constituted by the connection pin 42 and the connection orifices 40, 41 of the aforementioned guide piece 24.

In the configuration of the third embodiment (FIGS. 17 to 19), the drive device 7 and the slide case 4 are not disposed on a straight line. Therefore, the drive device 7 is additionally provided with the bell crank 43, and the drive direction of the drive device 7 is converted into the movement direction of the slide case 4. Further, the bell crank 43 and the guide piece 24 are connected by the rod 77A, and the rod 77A and the guide piece 24 are connected by the removable/insertable connection pin 42. Therefore, in the third embodiment, the projecting portion 77e having the connection orifice 77Aa formed in the rod 77A serves as a connection member 77a of the drive device 7. The first alignment surface (a) and the second alignment surface (b) are provided in the guide piece 24 at the surface pressure operation position and discharge position, respectively, for aligning the projecting portion 77e. The first alignment surface (a) and the second alignment surface (b) are provided such that the center of the first and second connection orifice 40, 41 and the center of the connection orifice 77Aa of the projecting portion 77e match each other at each connection position, and the connection pin 42 can be easily inserted and removed at each connection portion.

The surface pressure release method of the third embodiment is performed as described below. In this case, among the first and second connection orifices 40, 41 present in two locations, the position of the orifice on the drive device 7 side is taken as a discharge position, and the position on the slide case 4 side is taken as a surface pressure operation position, but the reverse arrangement is also possible. The projecting portion 77e having the connection orifice 77Aa forms a connection member.

The procedure of the third embodiment shown in FIGS. 17 to 19 is described below.

M. The connection pin 42 is pulled out, and the connection of the rod 77A and the guide piece 24 is released.

N. The drive device 7 is operated, the projecting portion 77e is moved till it abuts against the first alignment surface (a), and the connection orifice 77Aa is aligned with the second connection orifice 41.

O. The connection pin 42 is inserted into the second connection orifice 41. As a result, the rod 77A and the guide piece 24 are connected to each other at the surface pressure operation position.

P. The drive device 7 is operated, and the slide case 4 is moved to the surface pressure release position. As a result, the surface pressure is released.

The SV apparatus 30 is then opened, the refractories are inspected and replaced, the slide valve apparatus 30 is closed, and the surface pressure application and connection positions are switched by the following procedure.

Q. The drive device 7 is operated, and the slide case 4 is moved to the fully open position. As a result, the surface pressure is applied.

R. The connection pin 42 is pulled out. As a result, the connection of the rod 77A and the guide piece 24 is released.

S. The drive device 7 is operated, the projecting portion 77e is moved till it abuts against the second alignment surface (b), and the connection orifice 77Aa is aligned with the first connection orifice 40.

T. The connection pin 42 is inserted into the first connection orifice 40. As a result, the rod 77A and the guide piece 24 are connected at the discharge position.

In the third embodiment, the first alignment surface (a) and the second alignment surface (b) of the guide piece 24 are curved surfaces matching the shape of the projecting portion 77e, but those surfaces may also have a polygonal or flat shape. Further, the length of the entire SV apparatus 30 may be reduced by providing the guide piece 24 with the extension guide 23 in the same manner as in the above-described first embodiment.

Further, as another implementation of the third embodiment, two connection orifices 40, 41 may be provided in the slide case 4 or the projecting portion 77e, rather than in the guide piece 24. By using the rod 77A of a telescopic system and switching the length of the rod 77A during the discharge and surface pressure release/application, it is possible to demonstrate substantially the same effect as when the connection positions are switched.

Components the same as those of the above-described first embodiment are assigned with the same reference numerals and the explanation thereof is herein omitted.

In the configuration of the fourth embodiment (FIGS. 20 and 21), the bell crank 43 of the third embodiment (FIGS. 17 to 19) is not used, and the drive device 7 and the slide case 4 are arranged on a straight line. The drive device 7 and the guide piece 24 are connected by the removable/insertable connection pin 42. Therefore, the connection positions can be switched and the surface pressure release/application can be performed in the same procedure as in the third embodiment (FIGS. 17 to 19) by removing and inserting the connection pin 42. In the fourth embodiment (FIGS. 20 and 21), the first alignment surfaces (a), (b) of the guide piece 24 and the abutment surface of the connection member 77a constituted by the projecting portion 77e, which has the connection orifice 77Aa formed in the rod 7A of the drive device 7, are flat, but those surfaces may be also curved or polygonal. Further, the length of the entire SV apparatus 30 may be reduced by providing the guide piece 24 with the extension guide 23 in the same manner as in the first embodiment (FIGS. 5 to 9). By using the rod 7A of a telescopic system and switching the length of the rod 7A during the discharge and surface pressure release/application, it is possible to demonstrate substantially the same effect as when the connection positions are switched.

Components the same as those of the above-described first embodiment are assigned with the same reference numerals and the explanation thereof is herein omitted.

The features of the slide valve apparatus for automatic application of surface pressure in accordance with the present invention are summarized below.

Thus, the slide valve apparatus for automatic application of surface pressure includes: the fixed plate 3 incorporated in the base frame 2 fixedly attached to the lower surface of the bottom portion of the molten metal vessel 1; the slide case 4 that is movably provided below the fixed plate 3, incorporates the slide plate 5 inside thereof, and supports the chute nozzle 6; and the drive device 7 that moves the slide case 4, flow rate control and surface pressure application/release during molten metal discharge being performed by moving the slide case 4 with the drive device 7. The apparatus is configured to have the connection switching means 20, 200 for switching the connection position of the drive device 7 and the slide case 4 between the first connection position (discharge position) during molten metal discharge and the second connection position (surface pressure operation position) during surface pressure application/release, the second connection position being different from the first connection position.

The apparatus may be configured such that the drive device 7 and the slide case 4 are connected by the guide piece 24, and the connection switching means 20, 200 is provided at the guide piece 24.

The apparatus may be also configured such that the drive device 7 and the slide case 4 are disposed on a straight line.

The apparatus may be also configured such that the drive device 7 and the slide case 4 are not disposed on a straight line, and the drive device 7 is connected to the slide case 4 or the guide piece 24 by the direction converting mechanism 60 for converting a drive direction of the drive device 7 into a movement direction of the slide case 4.

The apparatus may be also configured such that switching of the connection position is performed by actuating the drive device 7 according to the operation of the connection switching means 20, 200.

The apparatus may be also configured such that the connection switching means 20 is constituted by a member that is provided inside the opening 25 formed in the guide piece 24 and has the recess 20a.

The connection switching means 200 may be configured by a removable/insertable connection pin 42 for connecting the drive device 7 to the slide case 4 or the guide piece 24, and the connection site constituted by first and second connection orifices 40, 41 for removably/insertably mounting the connection pin 42 at the discharge position and surface pressure operation position, and the connection position of the drive device 7 may be switched by removing/inserting the connection pin 42, selecting the connection site corresponding to the discharge position or the surface pressure operation position, and performing connecting.

The apparatus may be also configured such that the connection member 7a, 77a constituted by the projecting portion 7e, 77e formed at the distal end of the rod 7A, 77A of the drive device 7 abuts against first and second alignment surfaces (a), (b) provided inside the opening 25 formed in the guide piece 24, thereby aligning the connection member 7a, 77a with the discharge position or surface pressure operation position for connecting the drive device 7 to the slide case 4 or the guide piece 24.

The apparatus may be also configured such that the alignment surfaces (a), (b) are of a flat, curved, or polygon shape.

The guide piece 24 may be configured to move linearly along the guide rail 22 provided at the base frame 2 and the extension guide 23 installed such as to slide along and extend the guide rail 22.

INDUSTRIAL APPLICABILITY

In the slide valve apparatus for automatic application of surface pressure, the extra stroke for surface pressure application/release can be absorbed inside the slide valve apparatus by using the connection switching means, the stroke of the drive device can be shortened, the cost can be reduced, and the already installed drive device can be used when the slide valve apparatus is upgraded.

The invention claimed is:

1. A slide valve apparatus for automatic application of surface pressure comprising: a fixed plate incorporated in a base frame fixedly attached to a lower surface of a bottom portion of a molten metal vessel; a slide case that is movably provided below the fixed plate, incorporates a slide plate inside thereof, and supports a chute nozzle; and a drive device that moves the slide case, flow rate control and surface pressure application/release during molten metal discharge being performed by moving the slide case with the drive device, the slide valve apparatus for automatic application of surface pressure further comprising:
    connection switching means for switching a connection position of the drive device and the slide case between a first connection position (discharge position) during molten metal discharge and a second connection position (surface pressure operation position) during surface pressure application/release, the second connection position being different from the first connection position
    wherein the drive device and the slide case are connected by a guide piece, and the connection switch means is provided at the guide piece; and
    wherein the guide piece is configured to move linearly along a guide rail provided at the base frame and an extension guide installed such as to slide along and extend the guide rail.

2. The slide valve apparatus for automatic application of surface pressure according to claim 1, wherein the drive device and the slide case are disposed on a straight line.

3. The slide valve apparatus for automatic application of surface pressure according to claim 1, wherein the drive device and the slide case are not disposed on a straight line, and the drive device is connected to the guide piece by a direction converting mechanism for converting a drive direction of the drive device into a movement direction of the slide case.

4. The slide valve apparatus for automatic application of surface pressure according to claim 1, wherein switching of the connection position is performed by actuating the drive device.

5. The slide valve apparatus for automatic application of surface pressure according to claim 1, wherein the connection switching means is constituted by a member that is provided inside an opening formed in the guide piece and has a recess.

6. The slide valve apparatus for automatic application of surface pressure according to claim 1, wherein the connection switching means is configured by a removable/insertable connection pin for connecting the drive device to the guide piece, and a connection site constituted by first and second connection orifices for removably/insertably mounting the connection pin at the discharge position and surface pressure operation position, and the connection position of the drive device is switched by removing/inserting the connection pin, selecting the connection site corresponding to the discharge position or the surface pressure operation position, and performing connecting.

7. The slide valve apparatus for automatic application of surface pressure according to claim 5, wherein a connection member constituted by a projecting portion formed at a distal end of a rod of the drive device abuts against first and second alignment surfaces provided inside an opening formed in the guide piece, thereby aligning the connection member with the discharge position or surface pressure operation position for connecting the drive device to the guide piece.

8. The slide valve apparatus for automatic application of surface pressure according to claim 1, wherein the alignment surfaces are of a flat, curved, or polygon shape.

9. A slide valve apparatus for automatic application of surface pressure comprising: a fixed plate incorporated in a base frame fixedly attached to a lower surface of a bottom portion of a molten metal vessel; a slide case that is movably provided below the fixed plate, incorporates a slide plate inside thereof, and supports a chute nozzle; and a drive device that moves the slide case, flow rate control and surface pressure application/release during molten metal discharge being performed by moving the slide case with the drive device, the slide valve apparatus for automatic application of surface pressure further comprising:
a connection switch configured to switch a connection position of the drive device and the slide case between a first connection position (discharge position) during molten metal discharge and a second connection position (surface pressure operation position) during surface pressure application/release, the second connection position being different from the first connection position
wherein the drive device and the slide case are connected by a guide piece, and the connection switch is provided at the guide piece; and
wherein the guide piece is configured to move linearly along a guide rail provided at the base frame and an extension guide installed such as to slide along and extend the guide rail
wherein the drive device and the slide case are connected by a guide piece, and the connection switch is provided at the guide piece; and
wherein the guide piece is configured to move linearly along a guide rail provided at the base frame and an extension guide installed such as to slide along and extend the guide rail.

10. The slide valve apparatus for automatic application of surface pressure according to claim 9, wherein the drive device and the slide case are disposed on a straight line.

11. The slide valve apparatus for automatic application of surface pressure according to claim 9, wherein the drive device and the slide case are not disposed on a straight line, and the drive device is connected to the guide piece by a direction converting mechanism for converting a drive direction of the drive device into a movement direction of the slide case.

12. The slide valve apparatus for automatic application of surface pressure according to claim 9, wherein switching of the connection position is performed by actuating the drive device.

13. The slide valve apparatus for automatic application of surface pressure according to claim 9, wherein the connection switch is constituted by a member that is provided inside an opening formed in the guide piece and has a recess.

14. The slide valve apparatus for automatic application of surface pressure according to claim 9, wherein the connection switch is configured by a removable/insertable connection pin for connecting the drive device to the guide piece, and a connection site constituted by first and second connection orifices for removably/insertably mounting the connection pin at the discharge position and surface pressure operation position, and the connection position of the drive device is switched by removing/inserting the connection pin, selecting the connection site corresponding to the discharge position or the surface pressure operation position, and performing connecting.

15. The slide valve apparatus for automatic application of surface pressure according to claim 13, wherein a connection member constituted by a projecting portion formed at a distal end of a rod of the drive device abuts against first and second alignment surfaces provided inside an opening formed in the guide piece, thereby aligning the connection member with the discharge position or surface pressure operation position for connecting the drive device to the guide piece.

16. The slide valve apparatus for automatic application of surface pressure according to claim 15, wherein the alignment surfaces are of a flat, curved, or polygon shape.

* * * * *